March 1, 1960  H. A. HIPPEN  2,926,553
VEHICLE TRANSMISSION

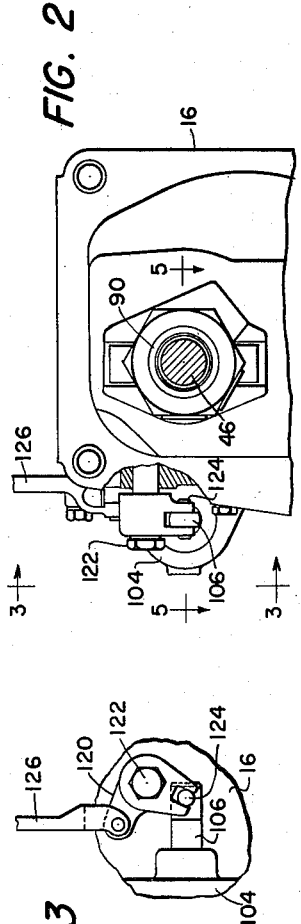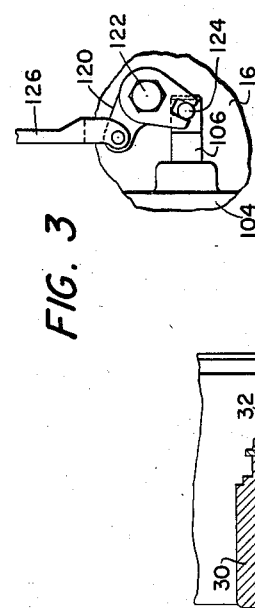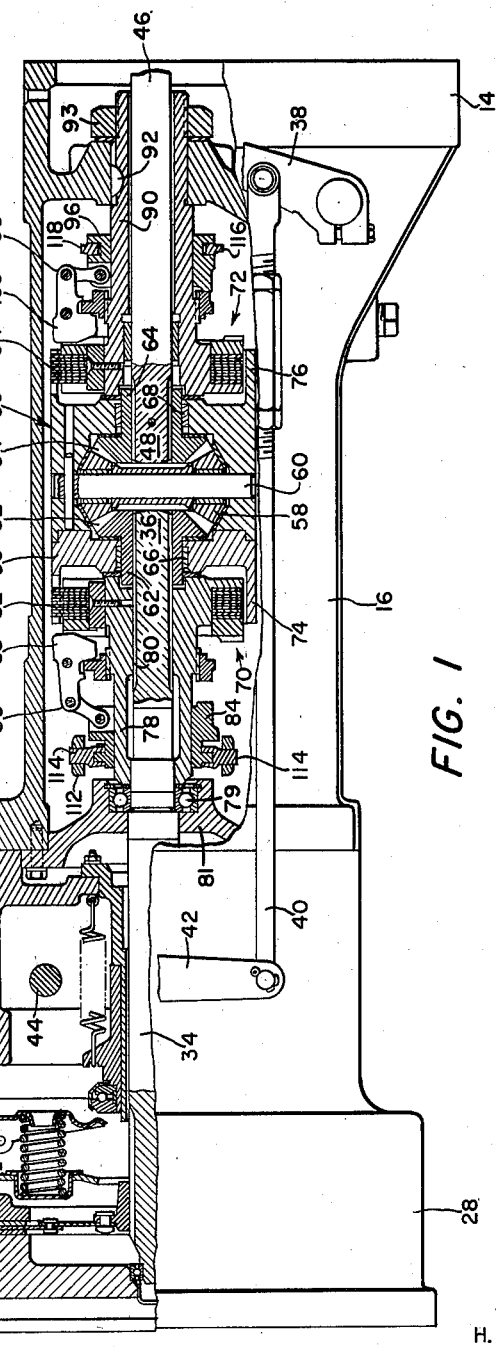

Filed March 25, 1958  2 Sheets-Sheet 2

INVENTOR.
H.A.HIPPEN

United States Patent Office 2,926,553
Patented Mar. 1, 1960

2,926,553

VEHICLE TRANSMISSION

Herman A. Hippen, Dubuque, Iowa, assignor, by mesne assignments, to Deere & Company, a corporation of Delaware Application March 25, 1958, Serial No. 723,754

2 Claims. (Cl. 74—780)

This invention relates to a vehicle transmission and more particularly to an auxiliary drive interposed between the power shaft and the transmission input shaft and capable of selectively effecting forward or reverse rotation of the latter, whereby the vehicle so equipped may be driven forwardly or backwardly at any one of a plurality of the same speed ratios. A vehicle so equipped is particularly useful in materials handling operations, as will be readily apparent to those versed in the art without further elaboration.

It is an important feature of the invention to provide an improved reversing mechanism incorporating a compact unitary organization including constant mesh gearing and coaxial clutch and brake means. A further feature of the invention resides in improved operating mechanism for the reversing means. A still further object of the invention is the provision of improved and simple operating means mountable on a cover associated with the housing that encloses the reversing means. The invention has for a further feature the incorporation of the unit of the type described in a tractor of otherwise conventional construction.

The foregoing and other important objects and desirable features inherent in and encompassed by the invention will become apparent as a preferred embodiment thereof is disclosed in detail in the ensuing description and accompanying sheets of drawings, the several figures of which are described immediately below.

Fig. 1 is a longitudinal section through a vehicle, showing the association of the reversing means with the power shaft and a coaxial transmission shaft.

Fig. 2 is a fragmentary rear elevation, partly in section, of the structure shown in Fig. 1.

Fig. 3 is a fragmentary side view as seen along the line 3—3 of Fig. 2.

Figure 4:
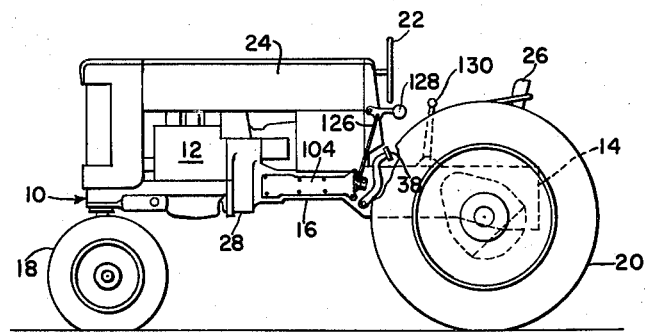
Fig. 4 is a view on a reduced scale showing a typical agricultural tractor equipped with the inventive structure.

Reference will be had first to Fig. 4 for an environmental picture of the vehicle to which the reversing mechanism is especially adapted. As seen in that figure, the vehicle is a conventional agricultural tractor having a main body 10 comprising a forward power plant, such as an internal combustion engine 12, a rear transmission case 14 and an intermediate fore-and-aft elongated housing 16 extending between the power plant and the front of the transmission case. The body as a whole is carried on steerable front wheel means 18 and the power train established by the mechanism about to be described furnishes power to rear traction wheels 20. A steering wheel 22 for the front wheel means 18 is positioned rearwardly of an engine hood 24 and is convenient to an operator on an operator's seat 26, as are other controls to be presently described.

Fig. 1, as well as Fig. 4, shows that the rear part of the power plant or engine 12 includes a bell housing 28 which houses a typical fly wheel 30 and master clutch 32 for establishing and interrupting drive to a power shaft 34 which has a splined terminal rear end 36 projecting rearwardly into the elongated intermediate housing 16. Engagement and disengagement of the master clutch 32 is effected in any suitable manner, as via a clutch pedal 38 proximate to the seat 26 and connected by a forwardly extending link 40 to an arm 42 which is in turn connected typically to a throw out shaft 34. These details may be varied and form no part of the present invention. Hence, they are illustrated and described only generally as a background for the remainder of the structure.

The transmission case 14 includes conventional change-speed gearing (not shown), for producing any one of several speed ratios for driving the traction wheels 20. A transmission shaft 46 extends forwardly from the transmission case 14 to a terminal front end 48 coaxially spaced apart from the terminal rear end 36 of the power shaft 34. The drive mechanism interconnecting the shafts 34 and 46 at their respective terminal ends 36 and 48 is designated in its entirety by the numeral 50, and includes a rearwardly facing bevel gear 52 on the rear end 36 of the shaft 34, a forwardly facing bevel gear 54 on the forward end 48 of the transmission shaft 46, a carrier 56, and a plurality of bevel pinions 58 journaled on the carrier on a cross shaft 60 that has its axis normal to the common axis of the power and transmission shafts 34 and 46. The bevel gears 52 and 54 are splined respectively to the ends 36 and 48 of the power and transmission shafts and respectively have forwardly and rearwardly projecting hubs 62 and 64 on which the carrier is journaled as at 66 and 68 respectively. The arrangement is such that if the carrier 56 is connected to rotate with the power shaft 34, it will act through the gearing 52—58—54 to drive the transmission shaft 46 in the same direction as the power shaft. If the carrier 56 is immobilized, as by locking it to the housing 16, the power shaft 34 will act through the gearing 52 and 54 and will react against the immobilized carrier to drive the shaft 46 in the reverse direction. Hence, the mechanism 50 is capable of producing in the transmisison case 14 the same number of speeds in either forward or reverse drive.

The means for selectively controlling the mechanism 50 comprises a front clutch 70 and a rear brake 72 located respectively ahead of and behind the carrier 56, and the carrier has a forward extension in the form of a drum 74 which affords the driven element of the clutch 70. A rearward drum extension 76 on the carrier affords the lockable part of the brake 72. The driving part of the clutch 70 includes a sleeve 78 splined to the power shaft 34 at 80, and a plurality of clutch plates 82 complete the clutch. The sleeve 78 cannot shift axially forwardly, because it abuts a bearing 79 in a rigid but removable front housing wall 81.

An axially slidable shifter 84 is mounted on the clutch sleeve 78 and when shifted forwardly or to the left as seen in the drawings acts through toggle means 86 and cams 88 to effect engagement of the clutch 70 whereby the carrier 56 is driven with the shaft 34 and sleeve 78. Rearward shifting of the shifter 84 of course disengages the clutch 70.

The brake 72 includes, in addition to the drum extension 76 on the carrier 56, a sleeve 90 which is keyed at 92 to the housing 16 and which is held against axial shifting by a nut 93. This sleeve includes at its forward end a plurality of brake plates engageable and disengageable with similar brake plates carried by the carrier extension drum 76. The set of plates as a whole is designated by the numeral 94. A rear shifter 96 is axially shiftably carried by the sleeve 90 and operates through toggle means 98 and cams 100 to engage and disengage the brake plates 94. The brake 72 as shown in Fig. 1 is disengaged. When the shifter 96 is moved rearwardly, it effects engagement of the brake 72.

Figure 5:
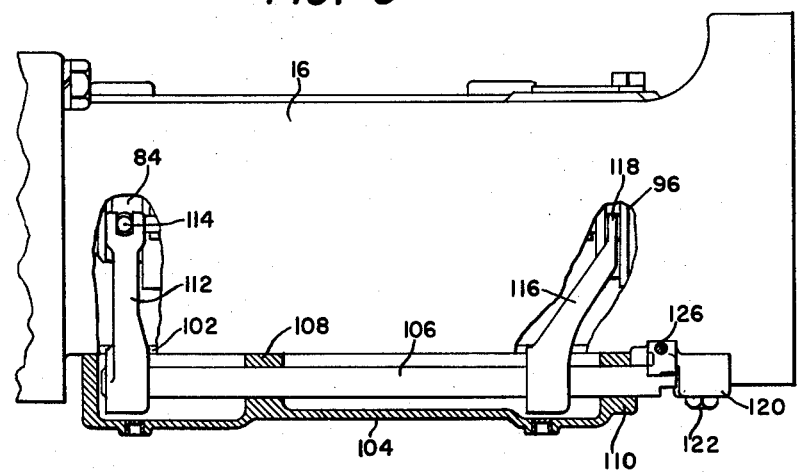
Fig. 5 is a fragmentary plan view of the structure seen in Fig. 1, partly in section and broken away generally in a plane including the line 5—5 on Fig. 2.

A further feature of the invention is means for operating the clutch and brake. This means is best shown in Figs. 2, 3 and 5. The housing 16 is provided at one side thereof with an elongated fore-and-aft opening 102 which is closed by a cover 104. This cover is so shaped as to enclose a major part of the operating means, which, as seen in Fig. 5 incorporates a fore-and-aft operating shaft 106 slidably supported internally of the cover 104 as by bearings 108 and 110. A forward part of the shaft 106 has rigidly secured thereto an inwardly extending shifter fork 112 which receives radial pins 114 on the clutch shifter 84. A rear shifter fork 116 is rigid on a rear part of the shaft 106 within the cover housing 104 and is bifurcated at 118 for a typical connection to the brake shifter 96.

From the description thus far it will be seen that when the operating shaft 106 is shifted forwardly, it will shift the front and rear shifters 84 and 96 also forwardly, causing engagement of the clutch 70 and disengagement of the brake 72. Rearward shifting of the shaft 106 will cause the reverse; namely, engagement of the brake 72 and disengagement of the clutch 70. As already described, engagement of the clutch 70 establishes forward drive of the transmission shaft 46, and immobilizing or engagement of the brake causes reverse drive of the shaft 46.

Selective shifting of the shaft 106 is effected externally by means of a lower bell crank 120 rockably carried at a suitable point on the housing 16 as by a short rockshaft 122 (Figs. 2 and 3). One arm of the bell crank is bifurcated for connection to a cross pin 124 on the exposed outer end of the shaft 106, and the other arm of the bell crank is connected to an upwardly extending link 126 which in turn is connected at its opposite end to a control lever 128 convenient to the operator's seat 26. Manipulation of the lever 128 is of course independent of the selective use of the conventional shift lever, as at 130, for selecting the speeds in the transmission case 14. Thus, the vehicle may be driven either forwardly or rearwardly at any one of the speed ratios afforded by whatever type of transmission is used in the vehicle.

The operation of the mechanism should be clear from the foregoing, as should be the salient features and objects of the invention. Other objects will readily occur to those versed in the art, as will modifications and alterations in the preferred embodiment disclosed, all of which may be achieved without departure from the spirit and scope of the invention.

What is claimed is:

1. In a tractor having a fore-and-aft body including a forward power plant and a transmission spaced rearwardly from the power plant, the improvement comprising: an intermediate housing carried by the body between the power plant and transmission; a power shaft driven by the power plant and extending rearwardly into the housing to a terminal rear end; a transmission shaft extending forwardly into the housing from the transmission coaxially with the power shaft and having a terminal front end proximate to the rear end of said power shaft; a rearwardly facing front level gear coaxially fixed to the rear end of the power shaft and having a forwardly extending hub; a forwardly facing bevel gear coaxially fixed to the front end of the transmission shaft in coaxially spaced relation to the front bevel gear and having a rearwardly extending hub; a non-axially shiftable front sleeve concentrically about the power shaft and separable from and extending forwardly from the front bevel gear hub and keyed to the power shaft; a non-axially shiftable rear sleeve loosely concentric with the transmission shaft and separate from and extending rearwardly from the rear bevel gear hub and rigidly connected to the housing; a carrier concentric with and straddling and journaled on the bevel gear hubs independently of the sleeves; a bevel pinion journaled on the carrier on an axis normal to the axis of the shafts and meshing with the bevel gears; a clutch concentrically mounted in part on the front sleeve and in part on the carrier and engageable to connect the front sleeve and carrier to turn in unison and disengageable to permit relative rotation of the two; a brake concentrically mounted in part on the rear sleeve and in part on the carrier and engageable to lock the carrier to the rear sleeve and disengageable to free the carrier; front and rear shifters axially slidably mounted respectively on the front and rear sleeves and coaxially shiftable fore-and-aft respectively on the front and rear sleeves to engage and disengage the clutch and brake; and operating means connected to the shifters for shifting both shifters in one direction to engage the clutch while disengaging the brake and in the opposite direction to engage the brake while disengaging the clutch.

2. The invention defined in claim 7 in which: the housing has an opening therein lengthwise thereof and in lateral register with the clutch and brake shifters; a cover is carried by the housing over the opening; and the operating means includes a fore-and-aft shifting member in said cover, said shifting member having fore-and-aft spaced apart arms extending into the housing and connected respectively to the shifters.

References Cited in the file of this patent

UNITED STATES PATENTS

| 2,347,099 | Gridley | Apr. 18, 1944 |
| 2,764,041 | Walker et al. | Sept. 25, 1956 |

FOREIGN PATENTS

| 850,385 | France | Sept. 11, 1939 |